(12) United States Patent
Hoang et al.

(10) Patent No.: US 9,231,690 B2
(45) Date of Patent: Jan. 5, 2016

(54) SIGNAL TRACKING AND DECODING IN GNSS

(71) Applicant: QUALCOMM Incorporated, San Diego, CA (US)

(72) Inventors: Duong Anh Hoang, San Diego, CA (US); Tianqi Wang, Santa Clara, CA (US); Jie Wu, San Diego, CA (US); Emilija Milorad Simic, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 14/029,449

(22) Filed: Sep. 17, 2013

(65) Prior Publication Data

US 2015/0078249 A1    Mar. 19, 2015

(51) Int. Cl.
  *H04B 7/185*      (2006.01)
  *G01S 19/24*      (2010.01)

(52) U.S. Cl.
  CPC .......... *H04B 7/18513* (2013.01); *G01S 19/243* (2013.01); *H04B 7/18582* (2013.01)

(58) Field of Classification Search
  CPC .................................................. H04B 7/18582
  See application file for complete search history.

(56) References Cited

U.S. PATENT DOCUMENTS

| 5,099,500 | A | 3/1992 | Furlong |
| 5,847,680 | A | 12/1998 | McBurney |
| 6,104,978 | A | 8/2000 | Harrison et al. |
| 7,822,152 | B2 | 10/2010 | Inagawa et al. |
| 8,311,174 | B1 | 11/2012 | Susai et al. |
| 8,331,395 | B2 | 12/2012 | Koga et al. |
| 2006/0126762 | A1 | 6/2006 | Tapucu et al. |
| 2010/0278220 | A1* | 11/2010 | Weill ............................. 375/150 |
| 2011/0090860 | A1* | 4/2011 | Ihm et al. ...................... 370/329 |
| 2012/0051465 | A1* | 3/2012 | Palaniappan .................. 375/340 |

FOREIGN PATENT DOCUMENTS

WO         9957573         11/1999

OTHER PUBLICATIONS

"BeiDou Navigation Satellite System Signal in Space Interface Control Document", Open Service Signal B1I (Version 1.0), China Satellite Navigation Office, Dec. 2012, 81 pages.
International Search Report and Written Opinion—PCT/US2014/051039—ISA/EPO—Jun. 11, 2015.

* cited by examiner

*Primary Examiner* — John Blanton
(74) *Attorney, Agent, or Firm* — Silicon Valley Patent Group LLP (57) ABSTRACT

Method, computer program product, and apparatus for signal tracking and decoding in GNSS are disclosed. In one exemplary implementation, a satellite receiver may be configured to receive a first sub-frame of a satellite signal. It defers a determination of validity of the first sub-frame until a preamble of a second sub-frame is received. The satellite receiver receives the preamble of the second sub-frame, and then determines whether there is a data decoding error of the first sub-frame using the first sub-frame and the preamble of the second sub-frame.

20 Claims, 7 Drawing Sheets

SIGNAL TRACKING AND DECODING IN GNSS

FIELD

The present disclosure relates to the field of wireless communications. In particular, the present disclosure relates to signal tracking and decoding in GNSS.

BACKGROUND

In some conventional navigation satellite signals, pilot signals may not be transmitted. To demodulate such signals, the receiver usually employs differential demodulation to overcome the difficulty of not having reference (pilot) signals. To assist the receiver to demodulate the signals, a satellite vehicle (SV) may need to encode the data differentially before the transmission. However, in some conventional satellite systems, the signals may not be encoded differentially, which may cause the receiver to be prone to data decoding errors (also referred to as cycle slips). In addition, in some conventional satellite systems, flaws in the code design may cause the receiver more susceptible to data decoding errors, as there may be no overlap between codewords in the sub-frame (also referred to as subframe). One example of such coding is BCH (15, 11, 1). This code has the property that if a string of 15 bits is a valid codeword, then the inverse of that string, formed by replacing 0 by 1 and 1 by 0, may also be a valid codeword. This property can cause the code to be useless in presence of data decoding errors. For example, the transmitter transmits a sequence of fifteen zeros. However, due to a cycle slip occurred before the codeword, the receiver may demodulate the string as a sequence of fifteen ones. Because of the property of the BCH code, the fifteen ones may also be a valid code word. If the cycle slip happens at the boundaries between two codewords, the receiver would not be able to detect that the word is in error by just relying on the BCH code, and the receiver may accept the fifteen ones as a valid code word. This problem can lead to large outliers since the ephemeris/almanac may be corrupted.

Therefore, there is a need for method, device, computer program product, and apparatus that can address the above issues of the conventional satellite systems.

SUMMARY

The present disclosure relates to signal tracking and decoding in GNSS. According to embodiments of the present disclosure, a method of signal tracking and decoding between consecutive sub-frames of a satellite signal may include receiving a first sub-frame, deferring a determination of validity of the first sub-frame until a preamble of a second sub-frame is received, receiving the preamble of the second sub-frame, and determining whether there is a data decoding error of the first sub-frame using the first sub-frame and the preamble of the second sub-frame.

In yet another embodiment, a GNSS receiver comprises a wireless transceiver and a signal decoding module. The wireless transceiver includes logic configured to receive a first sub-frame, the signal decoding module includes logic configured to defer a determination of validity of the first sub-frame until a preamble of a second sub-frame is received, the wireless transceiver includes logic configured to receive the preamble of the second sub-frame, and the signal decoding module includes logic configured to determine whether there is a data decoding error of the first sub-frame using the first sub-frame and the preamble of the second sub-frame.

In yet another embodiment, a non-transitory medium storing instructions for execution by one or more computer systems, the instructions comprise instructions for receiving a first sub-frame, instructions for deferring a determination of validity of the first sub-frame until a preamble of a second sub-frame is received, instructions for receiving the preamble of the second sub-frame, and instructions for determining whether there is a data decoding error of the first sub-frame using the first sub-frame and the preamble of the second sub-frame.

In yet another embodiment, an apparatus comprises means for receiving a first sub-frame, means for deferring a determination of validity of the first sub-frame until a preamble of a second sub-frame is received, means for receiving the preamble of the second sub-frame, and means for determining whether there is a data decoding error of the first sub-frame using the first sub-frame and the preamble of the second sub-frame.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the figures.

DESCRIPTION OF EMBODIMENTS

Embodiments of method, device, computer program product, and apparatus for signal tracking and decoding in GNSS are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
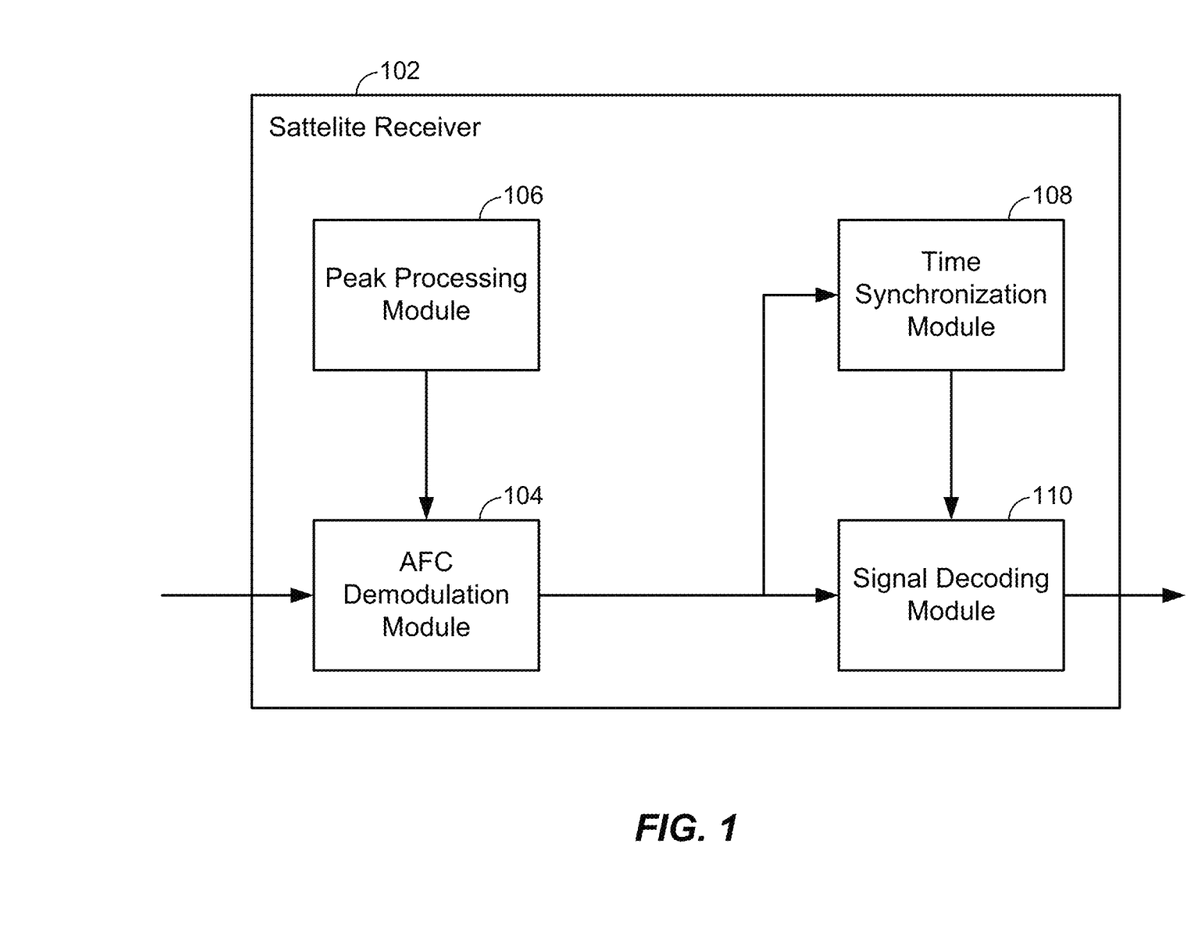
FIG. 1 illustrates an exemplary block diagram of a satellite receiver according to some aspects of the present disclosure.

FIG. 1 illustrates an exemplary block diagram of a satellite receiver according to some aspects of the present disclosure. As shown in FIG. 1, satellite receiver 102 may include AFC (automatic frequency control) demodulation module 104, peak processing module 106, time synchronization module 108, and signal decoding module 110. According to aspects of the present disclosure, satellite receiver 102 may include other modules and logical blocks, which are further described below in association with FIG. 7.

According to aspect of the present disclosure, the peak processing module 106 may be configured to perform peak processing, which includes, but not limited to: Carrier_to_noise ratio (C/No.) estimation, pulse time and frequency estimation, and threshold comparison. In one particular implementation, peak processing module 106 may be configured to search for a valid peak. The searching frequency may be dynamically adjusted. Peak processing module 106 may use a predicted center frequency approach to reduce the loss due to frequency drift. The frequency estimation from the previous search may be propagated to the middle of the next second. Then the peak processing module 106 may then use the propagated frequency to re-center the next second of searching. This approach may be beneficial in steady-state cases if the frequency does not drift at approximately a constant rate. Upon completion, peak processing module 106 may send an indication of completion to a channel controller, signaling that an energy grid may no longer be required for peak processing. In addition, peak processing module 106 may also be configured to send a derived peak information to a measurement controller (not shown). The measurement controller (MC) may apply additional processing to perform sanity checks of the peak. For example, at low signal-to-noise ratios, the MC may be configured to check that the measured peak and expected peak locations are congruent. In particular implementations, the application program interface (API) may be configured to support multiple peak reporting. In some situations, if a peak is deemed to be invalid, the MC may take no further action. This approach may allow a channel controller (CC) to continue the integration using initial settings provided.

According to aspects of the present disclosure, the satellite receiver 102 may be configured to evaluate a number of performance metrics, including but not limited to: bit error rate (BER) and undetected bit error rate (UBER) of received satellite signal, word error rate (WER) of received word (30-bit), undetected word error rate (UWER) of received word, normalized undetected word error rate (NUWER) of received word, where NUWER may represent the probability (for example, NUWER=UWER/(1−WER)) that a received word may contain error given that it has passed the parity check.

According to some aspects of the present disclosure, the satellite receiver 102 may be configured to detect a 180-degree phase flip. In some conventional satellite systems, there can be a 11-bit preamble per each subframe (every 6 seconds), where one example of the preamble sequence can be [1 1 1 0 0 0 1 0 0 1 0]. The polarity of the preamble can be used to further reduce the false alarm rate for received bits and words caused by a 180-degree phase flip. The following pseudo-code shows an exemplary approach to detect the 180-degree phase flip:

```
// demodulate to obtain the 0, 1 data bits;
AFC loop: demodulate the received bits;
// subframe synchronization is achieved by matching the preamble
```

-continued

```
sequence [11100010010] or its anti-polarity sequence [00011101101]
Time setting: obtain the subframe synchronization;
// The current subframe index is k;
buffer subframe (k);
// polarity(k) = 0 when there is no 180-degree phase flip; polarity(k)
= 1 when there is 180-degree phase flip;
polarity(k) = the preamble polarity of subframe(k);
// check the consistency of the current subframe preamble polarity and
the previous subframe preamble polarity;
// 1: means exact match and 0 degree flip;
// −1: means exact match and 180 degree flip;
// 0: means no exact match;
if polarity(k−1)!= known preamble or its flipped version // check the
received preamble with the known pattern;
    {
        discard subframe (k − 1);
    }
if polarity(k)!= polarity(k − 1) // if the polarity consistency check
fails;
    {
        discard subframe (k − 1);
    }
else                          // if the polarity consistency check
passes;
    {
        if (polarity(k − 1) == 1)
        {
            flip the polarity of every bit in subframe(k−1); // 0 becomes
1 and 1 becomes 0;
        }
        else
        {
            subframe(k−1) stays unchanged;
        }
    send subframe (k − 1) to deinterleaver and then BCH decoder;
    // subframe (k − 1) is discarded if any one of its 19 BCH messages
fails parity check. This is to lower the UWER if more than one 180-
degree phase flips happen in one subframe.
```

Figure 2:
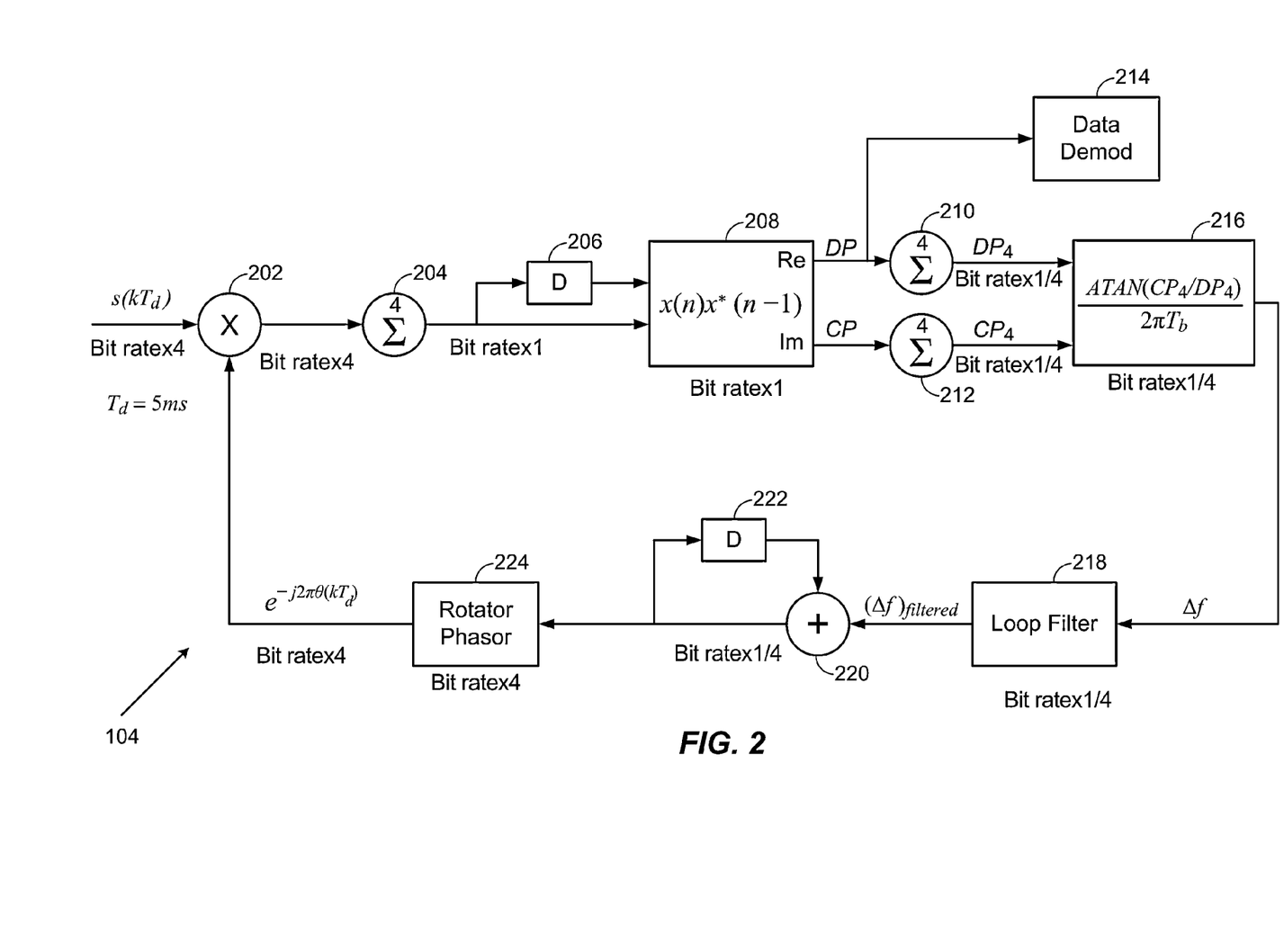
FIG. 2 illustrates an exemplary implementation of the AFC demodulation module of FIG. 1 according to some aspects of the present disclosure.

Referring to FIG. 2, it illustrates an exemplary implementation of the AFC demodulation module 104 of FIG. 1 according to some aspects of the present disclosure. In the example shown in FIG. 2, the AFC demodulation module 104 includes multiplier 202, accumulator 204, delay 206, DP_CP generator 208, accumulator 210, accumulator 212, data detect 214, ATAN discriminator 216, loop filter 218, adder 220, delay 222, and rotator phasor 224. According to aspects of the present disclosure, an AFC loop may be configured to operate offline on a 5 millisecond (ms) coherent sums that may be collected in the circular buffer. The AFC loop and data demodulation may be configured to track and adjust (de-rotate) the residual frequency error in the 5 ms coherent sums, which can be used for the data demodulation. In other implementations, a second-order AFC loop (not shown) may be adopted in the AFC demodulation module 104 in the satellite receive 102. One of the reasons to use a second-order AFC loop instead of first-order loop may be to reduce the dynamic stress (the steady-state frequency error) in presence of frequency ramp to 0 in the second-order AFC loop, which may result in improvement of demodulation sensitivity. The zero dynamic stress in the second-order AFC loop may also be used to reduce the disturbance when a searcher frequency delta is applied to the AFC loop.

Figure 3:
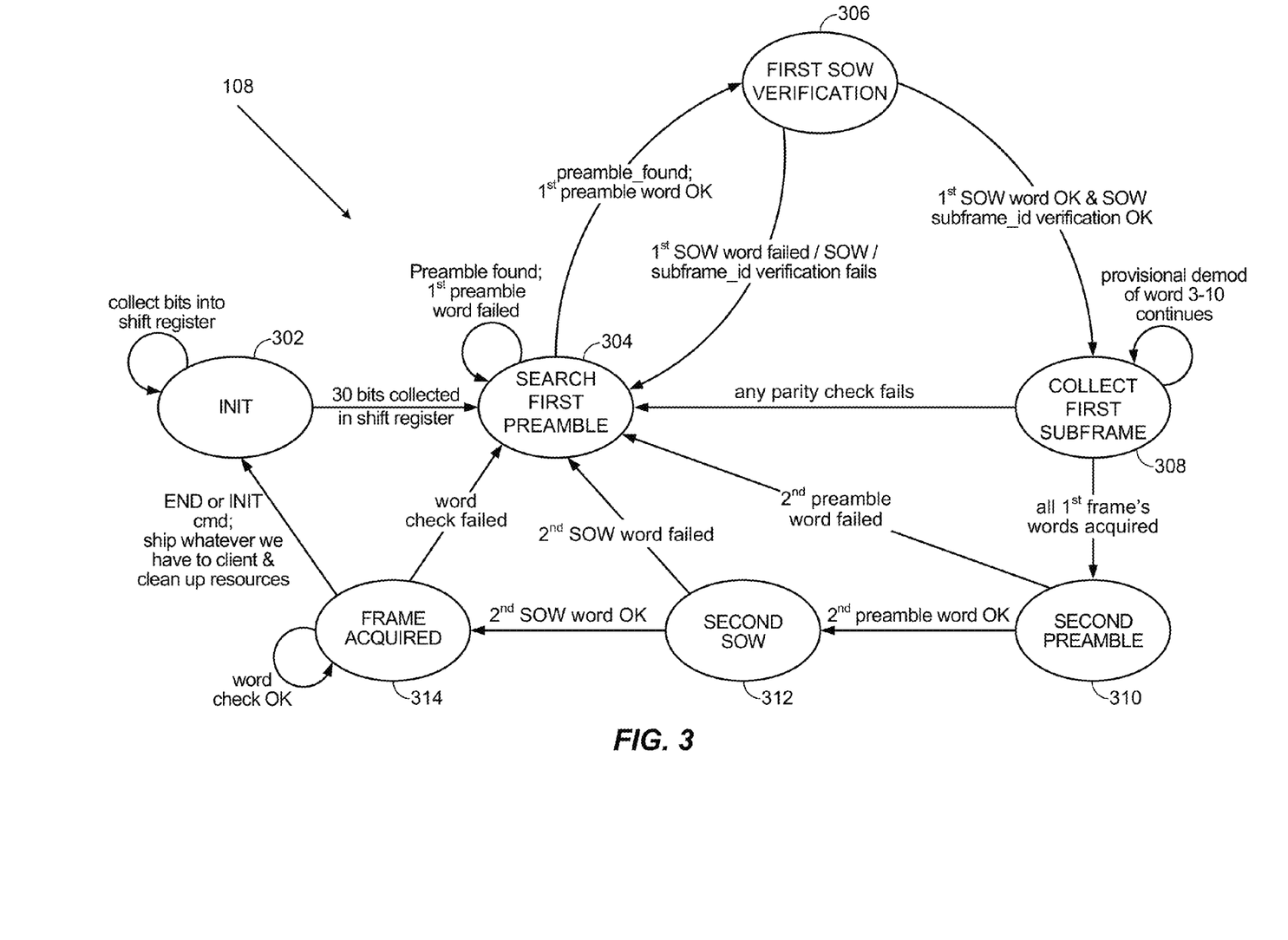
FIG. 3 illustrates an exemplary implementation of the time synchronization module of FIG. 1 according to some aspects of the present disclosure.

Now referring to FIG. 3, it illustrates an exemplary implementation of the time synchronization module 108 of FIG. 1 according to some aspects of the present disclosure. In this example, the first word (30-bit) in each subframe may be referred to as the "preamble word"; and the second word (30-bit) in each subframe may be referred to as second-of-week word "SOW word". As shown in FIG. 3, a state diagram of the time synchronization module 108 may include states: INIT 302, Search First Preamble 304, First SOW Verification

306, Collect First Subframe 308, Second Preamble 310, Second SOW 312, and Frame Acquired 314. The conditions for the transitions between the different states are shown in FIG. 3 and are further described in the following sections.

In some exemplary implementations, parity checks may be performed on words prior to such words being accepted as valid words. In some approaches, the following tests may be performed on the preamble of a word before accepting it as a correct word: 1) check that subframe ID (bits 16, 17, 18) and confirm that ID is between 1 and 5; 2) check whether the bits 1, 2, . . . , 11 match either [1 1 1 0 0 0 1 0 0 1 0] or [0 0 0 1 1 1 0 1 1 0 1]; note that if polarity of the preamble word is 180-degree reversed, the 30-bit preamble word can have polarity reversed on all 30 bits; and 3) perform parity check of the second 15 bits of the preamble word; note that parity check may be performed to ensure the correctness of the SOW information.

In some other exemplary implementations, the following tests may be performed on the SOW word before accepting it as a correct word:

a) Get the SOW information (bits 19 to 26 in preamble word and bits 1 to 12 in SOW word) and get the Subframe ID from SOW. Then compare the actual subframe ID with the one inferred from SOW.

For D1 signal: the inferred subframe ID from SOW may be: ((SOW %30)/6)+1 For example, if the current SOW is 42 seconds; then (SOW % 30) gives the reminder of 42/30=12; and ((SOW % 30)/6)=12/6=2; in this way, the inferred subframe ID=2+1=3.

b) If the subframe ID=1 (the 1$^{st}$ subframe), check the health flag (bit 13 of SOW word). If alert flag is asserted (e.g., '1'), discard the SOW; If the subframe ID~=1, bypass this check.

c) Check the range of the 20-bit SOW information, which can be within a week second range.

d) Check the 20-bit SOW information with the local known time.

e) Perform parity check.

In yet some other implementations, a week number may be accepted based on the following approach. Week number may be from subframe 1 word 3 and SV health may be from subframe 1 word 2. Parity may be passed to accept a week number.

In some cases, decoding an erroneous week number may lead to other problems. To provide added protection, it is desirable that the prior SOW to pass the parity check and sanity checks. If the bit synchronization is lost, then even the best 2 of 3 checks may not be sufficient when there is a week number already, as word 3 may likely have the exact same data for more than one SV being tracked. These added checks may incur a small loss in decoding capability, but they can greatly increase the protection for decoding erroneous week numbers. As a result, it is desirable for the first subframe to be parity error free. In addition, it is desirable to have quality signals received from SV (bit 13 of word 2 being '0'), and SOW word sanity check to be passed.

In one exemplary implementation, if there is no week number, a new week number may be accepted. Alternatively or additionally, the last two week numbers decoded may be stored. A new week number may be confirmed and accepted by choosing the one that has a match in at least 2 of the last 3 decodes. A special check may be included while in a special 2 hour zone right after the end-of-a-week (EOW) event. If special check fails, then decoded week may be stale. In that case, the decoded week pipeline may not be updated.

In one exemplary implementation, a special check may be performed at EOW. After the EOW, if there is already a week number, the new week number may be accepted only if it is not previous week (current week−1). In other words, it is desirable to protect against decoding stale data from the data bits (DBITs); for example the decoding logic may be delayed, or the control segment has not updated the week number in some situations.

If it is in the first two-hour window of the week and the previous decode is from previous week, the new week may be accepted (since there is no history of week decode in the current week). But if there is a previous decode from the current week, then the prior two week decodes may be stored, and the new week number may be accepted if it matches at least one other decode.

In one exemplary implementation, if any data decoding error is detected within a subframe, all 10 words may be marked having low confidence. But if Ephemeris is not available, up to a predetermined number of data decoding errors (e.g. 1, 2, etc.) in the word may be accepted before marking the words having low confidence.

In some situations, the receiver may have many cases of erroneous time-setting or incorrect bit-edge setting. If the frame synchronization is set incorrectly, there may be a possibility of decoding the data bits correctly (i.e. without data decoding error), but the parity check may fail, as the words may be constructed incorrectly. To recover from this situation, a new check may be added. In one approach, if there are no data decoding errors in the entire subframe, but more than 6 words have parity errors, a timing/frame-synchronization error may be declared. In such case, it is desirable to delete all clock information and measurements and re-start.

According to aspects of the present disclosure, a timing error may be declared in one of the one of the following conditions, including but not limited to:

(1) Based on the number of cycle slips observed, a UltraConfidence bit may be set for all 10 words in the subframe if any cycle slips are observed in the last 30 bits; which may be used for error check.

(2) In addition, a w_ConfidenceLow bit may be set to "0" for all 10 words. Normally this is a redundant check (in case UltraConfidence may not be computed properly).

(3) In a subframe, more than a predetermined percentage (e.g., 10%, 30%, 50%, etc.) of the number of words have failed parity check.

(4) The Preamble with an assumed subframe boundary does not match a predetermined preamble, for example [1 1 1 0 0 0 1 0 0 1 0] or its inverted version [0 0 0 1 1 1 0 1 1 0 1].

(5) SV is usable.

If the DBIT state machine has already been initiated, the data-bits may be deemed to be continuous. If there are gaps in the data-bits, the DBIT state machine may be reset, as it may not be known which bits may be lost.

Referring to FIG. 3, in state INIT 302, the time synchronization module 108 may be configured to initialize the buffers in the satellite receiver 102. If the receiver is in INIT state, and SV time has already been set by some other means such as SV differencing, or input from position engine, etc., the data-bit decoding variables, bit count and word count may be directly populated.

In state Search First Preamble 304, the time synchronization module 108 may be configured to collect bit-by-bit, and stay in this mode until the most recent 30 bits have a valid preamble and the preamble word has passed parity check. According to aspects of the present disclosure, if a preamble is found and the parity check has passed, the state machine may move to the next state of First SOW Verification 306. Otherwise, it may stay in the current state.

In state First SOW Verification 306, the time synchronization module 108 checks the first SOW using the following exemplary pseudo codes:

```
If parity fails or SOW check fails
    {move to first preamble state}
Else if receiver clock is set
    If clock unc is < A seconds (where A is a predetermined
    number in seconds)
        {If decoded time is within negative B or positive C (where B
        and C are predetermined number in seconds), set SV time (also
        try to set user clock), else move to C_DBIT_FIRST_FRAME state
        (need a second SOW check)}
    Else
        {Move to C_DBIT_FIRST_FRAME state (need a second SOW
        check)}
```

In state Collect First Subframe 308, the time synchronization module 108 may be configured to collect 10 words and then it may move to the state Second Preamble 310. In state Second Preamble 310, the time synchronization module 108 may be configured to check the second preamble using the following exemplary pseudo codes:

```
If parity passes and second preamble is verified,
    {move to C_BIT_SECOND_SOW state}
Otherwise,
    {move to first preamble check C_DBIT_FIRST_PREAMBLE}
```

In state Second SOW 312, the time synchronization module 108 may be configured to check the second SOW using the following exemplary pseudo codes:

```
If parity fails or SOW check fails,
    {move to C_DBIT_FIRST_PREAMBLE}
Otherwise,
    {read the SOW from second SOW word, and ensure that SOW is
    incremented by 6 (compared to FIRST_SOW, with week rollover
    check).Report subframe and move to C_DBIT_COLLECT state. Also
    set time on the SV, and try to set user clock}
```

In state Frame Acquired 314, the time synchronization module 108 may be configured to ensure the word check to be passed using the following exemplary pseudo codes:

```
If the PREAMBLE, SOW, or SOW checks fail,
    {move to first C_DBIT_FIRST_PREAMBLE}
Else,
    {keep forming subframes, and report.}
```

Figure 4:
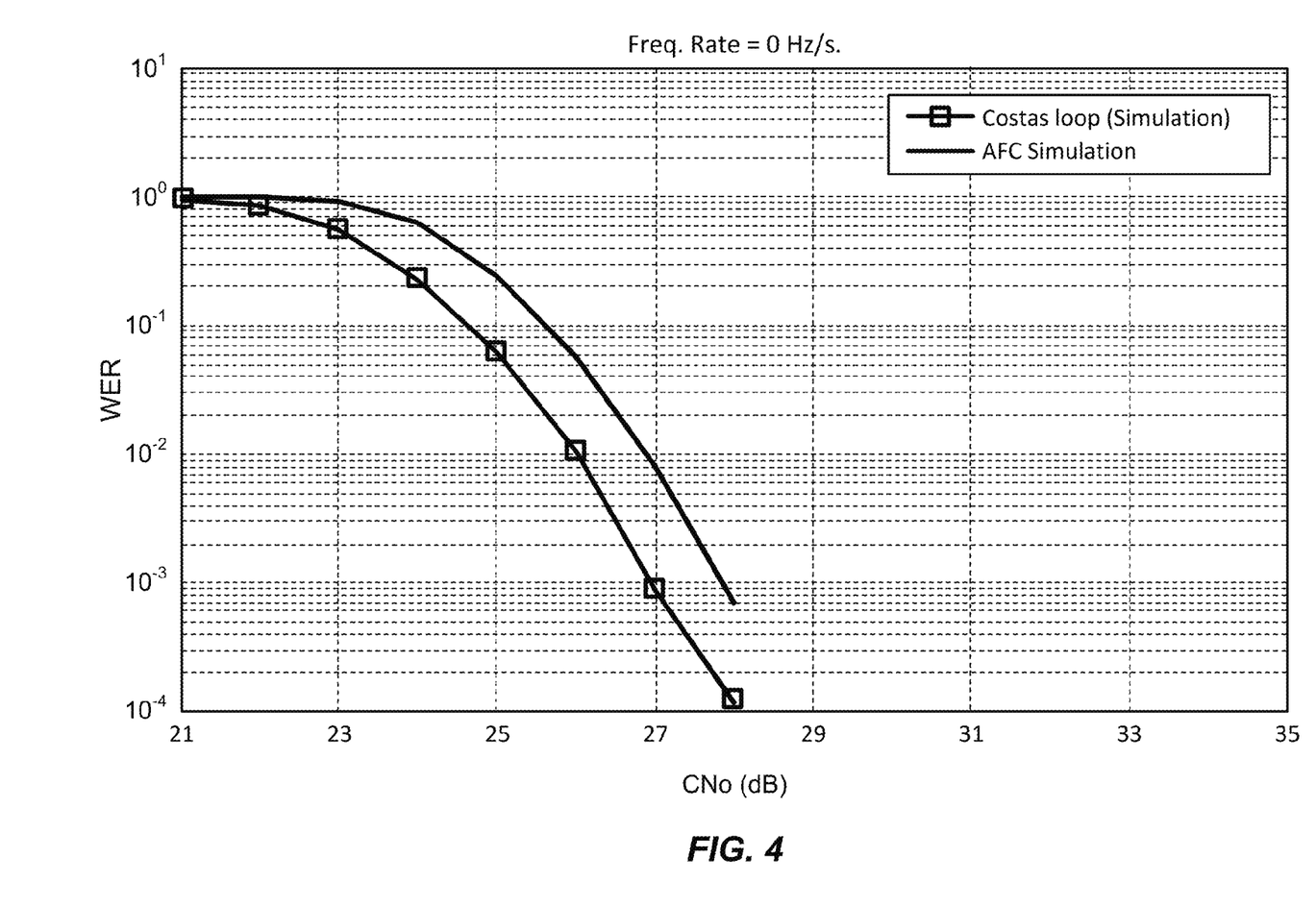
FIG. 4 illustrates a plot of word error rate versus carrier_to_noise ratio for the satellite receiver of FIG. 1 according to some aspects of the present disclosure.

FIG. 4 illustrates a plot of word error rate versus carrier_to_noise ratio for the satellite receiver 102 of FIG. 1 according to some aspects of the present disclosure. In the example shown in FIG. 4, the vertical axis represents the word error rate (WER) and the horizontal axis represents Carrier_to_noise ratio (C/No.) measured in dB, at operating frequency rate of 0 Hz/s. In one approach, the bit error rate of the received satellite signal may be determined based on received bits, assuming no word being discarded. To evaluate the bit error rate performance of the demodulation schemes (Costas versus AFC), the word/subframe level false alarm protection may be disabled. Note that Costas loop may suffer from data decoding errors in low SNR region. Sub-frame level phase correction may be used to resolve this issue. In some situations, AFC may suffer from bit error propagation in low SNR region.

In another approach, the word error rate of the received satellite signal may be derived based on the following rules, including but not limited to: 1) all 10 words in one subframe are in error when any one of the BCH messages in a subframe fails the parity checking (19 BCH messages per subframe); 2) If the 11-bit preamble of the subframe is not an exact match of either [1 1 1 0 0 0 1 0 0 1 0] or [0 0 0 1 1 1 0 1 1 0 1], all 10 words in one subframe may be deemed to be in error; and 3) If any bit in the demodulated word differs from the transmitted word, the demodulated word may be deemed to be in error.

In yet another approach, the undetected bit error rate (UBER) in the received satellite signal may be derived based on the rule that if a bit in an accepted BCH message differs from the transmitted bit, then this bit may be marked as a undetected bit error. In yet another approach, the undetected word error rate (UWER) in the received satellite signal may be derived based on the rule that if a word that passes the BCH parity check but differs from the transmitted word, then this word may be marked as an undetected word error.

According to aspects of the present disclosure, for Costas loop based demodulation scheme, the UBER below 1e-4 for C/No. values between 21 dB-Hz to 35 dB-Hz, and can ensure the false alarm bit rate below 1e-6 for C/No. values larger than 26 dB-Hz. For AFC based demodulation scheme, the UWER below 1e-3 for C/No. values between 21 dB-Hz to 35 dB-Hz, and can ensure the false alarm word rate below 1e-4 for C/No values larger than 25 dB-Hz. An exemplary performance of Costas loop versus AFC loop may be summarized as follows:

| Metrics | Target | Costas Loop | AFC Loop |
| --- | --- | --- | --- |
| Total word error rate | <=1e-2 | 26 dB-Hz | 27 dB-Hz |
| NUWER | ~0 | 27 dB-Hz | 27 dB-Hz |

Note that compared with AFC, Costas has better sensitivity (~1 dB @ 1% WER) when frequency rate may be less than 12 Hz (<12 Hz/s). In some situations, Costas may not work in high frequency rate, for example higher than 12 Hz/s.

According to aspects of the present disclosure, when decoding a sub-frame, the satellite receiver 102 may defer its decision until all the bits of the preamble of the next sub-frame have been received. First, the satellite receiver 102 may discard all the decoded data in the sub-frame if any of the 20 BCH codewords in the sub-frame fails the parity check. This parity check may help the satellite receiver 102 avoid data decoding errors that may occur in each word of the sub-frame. Second, the satellite receiver 102 may check the polarity of the current sub-frame against the preamble of the next sub-frame. The satellite receiver 102 may only accept the words in the sub-frame if the polarities of the two preambles are the same. This polarity check can be useful as it may help to eliminate odd number of data decoding errors that may occur in the sub-frame at the boundary of words. Third, the satellite receiver 102 may be configured to predict some of the bits in the sub-frame (for example, sub-frame ID, SOW, health bits, etc.). It can use these bits to perform consistency checks against the decoded data. If there is a mismatch between the decoded bit and the predicted bit, all the data in the sub-frame may be discarded. Fourth, since the ephemeris from an SV with low carrier-to-noise ratio (C/No) may potentially be corrupted by the data decoding errors, when forming a position solution, in one exemplary implementation, the satellite vehicle with a predetermined C/No. threshold may be used.

Figure 5:
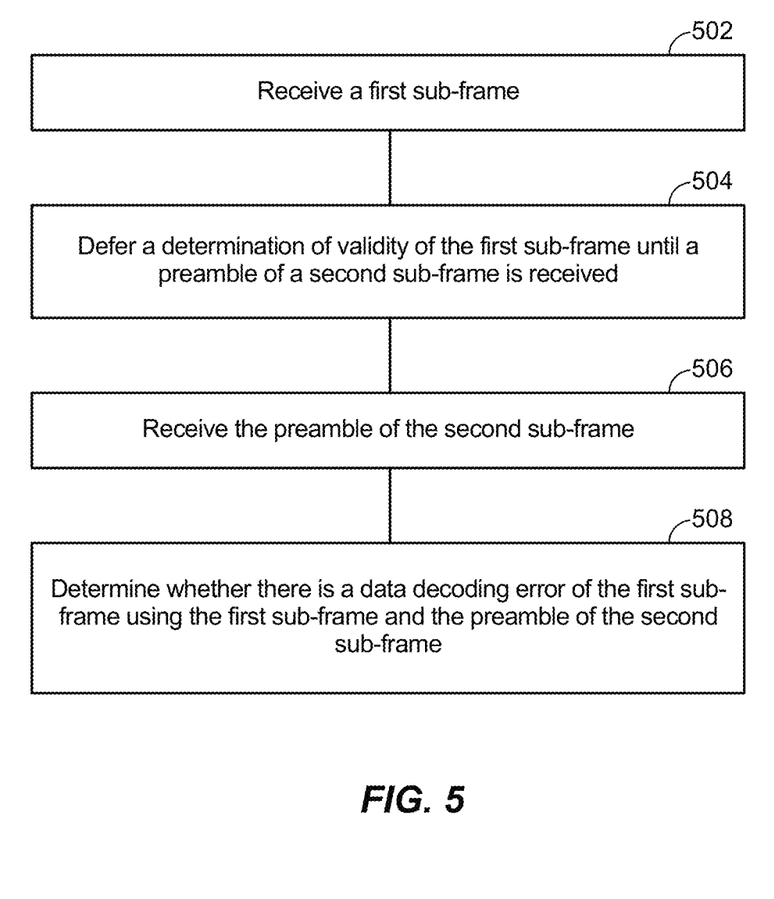
FIG. 5 illustrates a flow diagram of exemplary logical operations performed by the signal decoding module of FIG. 1 according to some aspects of the present disclosure.

FIG. 5 illustrates a flow diagram of exemplary logical operations performed by the signal decoding module 110 of the satellite receiver 102 of FIG. 1 according to some aspects of the present disclosure. As shown in FIG. 5, in block 502, the satellite receiver may be configured to receive a first sub-frame. In block 504, the satellite receiver may be configured to defer a determination of validity of the first sub-frame until a preamble of a second sub-frame is received. In block 506, the satellite receiver may be configured to receive the preamble of the second sub-frame. In block 508, the satellite receiver may be configured to determine whether there is a data decoding error of the first sub-frame using the first sub-frame and the preamble of the second sub-frame. Note that the first sub-frame and the second sub-frame can be consecutive sub-frames of the satellite signal.

In one exemplary implementation, the first sub-frame includes a preamble, a plurality of words. Each word may include one or more interleaved codewords. In another exemplary implementation, each word may include one or more non-interleaved codewords. In yet another exemplary implementation, each word may include a combination of one or more interleaved and non-interleaved codewords.

Figure 6:
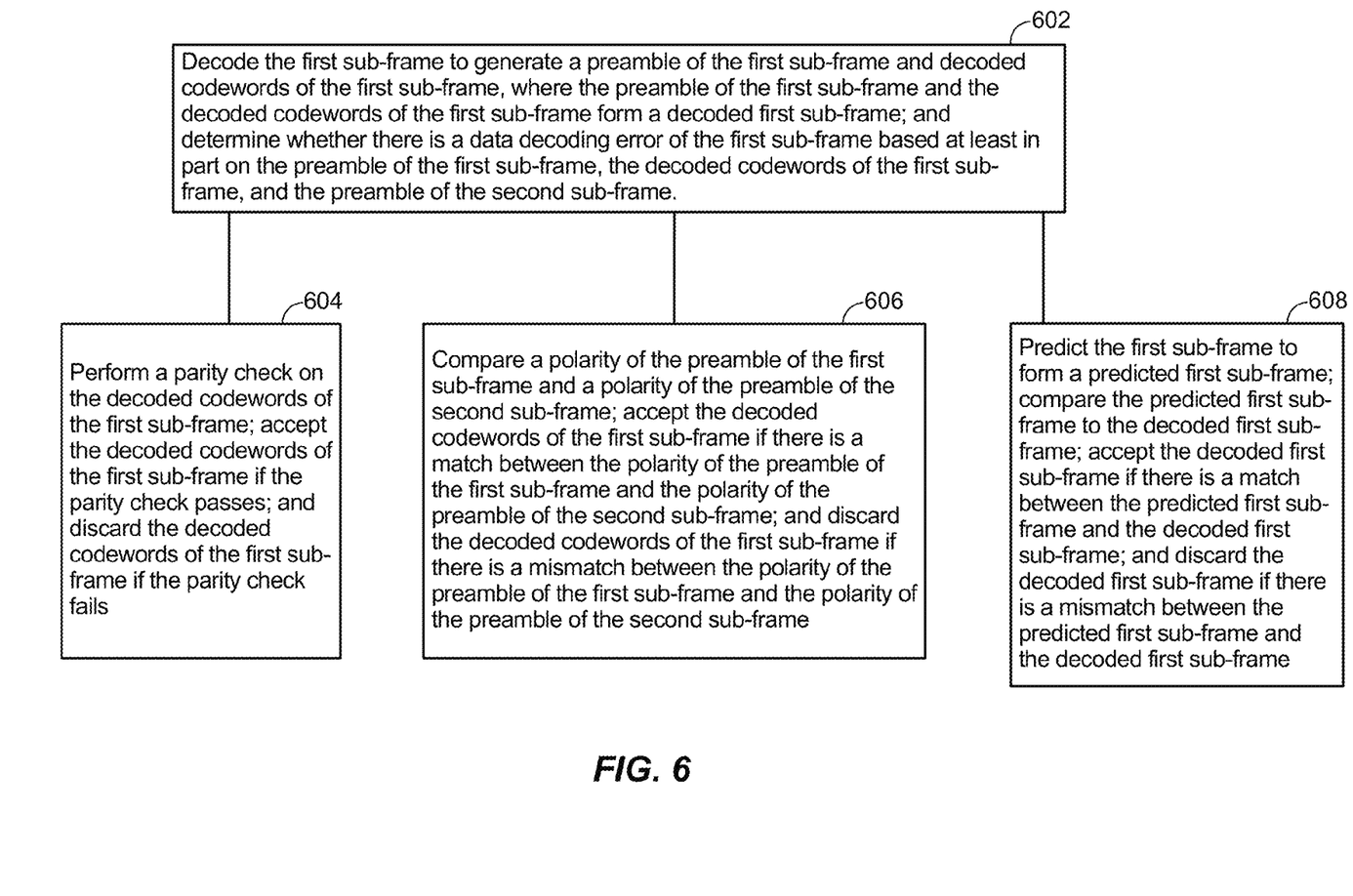
FIG. 6 illustrates a flow diagram of exemplary logical operations for determining data decoding error according to some aspects of the present disclosure.

FIG. 6 illustrates a flow diagram of exemplary logical operations for determining data decoding error in block 508 of FIG. 5 according to some aspects of the present disclosure. In the exemplary implementation shown in FIG. 6, in block 602, the satellite receiver may be configured to decode the first sub-frame to generate a preamble of the first sub-frame and decoded codewords of the first sub-frame, where the preamble of the first sub-frame and the decoded codewords of the first sub-frame form a decoded first sub-frame, and determine whether there is a data decoding error of the first sub-frame based at least in part on the preamble of the first sub-frame, the decoded codewords of the first sub-frame, and the preamble of the second sub-frame.

According to aspects of the present disclosure, the logical operations performed in block 602 may further include logical operation performed in blocks 604, 606 and 608. In block 604, the satellite receiver may be configured to perform a parity check on the decoded codewords of the first sub-frame; accept the decoded codewords of the first sub-frame if the parity check passes; and discard the decoded codewords of the first sub-frame if the parity check fails.

In block 606, the satellite receiver may be configured to compare a polarity of the preamble of the first sub-frame and a polarity of the preamble of the second sub-frame; accept the decoded codewords of the first sub-frame if there is a match between the polarity of the preamble of the first sub-frame and the polarity of the preamble of the second sub-frame; and discard the decoded codewords of the first sub-frame if there is a mismatch between the polarity of the preamble of the first sub-frame and the polarity of the preamble of the second sub-frame.

In block 606, the satellite receiver may be configured to predict the first sub-frame to form a predicted first sub-frame; compare the predicted first sub-frame to the decoded first sub-frame; accept the decoded first sub-frame if there is a match between the predicted first sub-frame and the decoded first sub-frame; and discard the decoded first sub-frame if there is a mismatch between the predicted first sub-frame and the decoded first sub-frame. Note that in one exemplary implementation, predicting the first sub-frame may include predicting a part of the first sub-frame, and the predicted part of the first sub-frame can be combined with the other parts of the first sub-frame to form the first sub-frame. In another exemplary implementation, predicting the first sub-frame may include predicting the whole first sub-frame, and the predicted first sub-frame can form the first sub-frame.

According to aspects of the present disclosure, a BCH decoding procedure with a look-up table may be used to implement the signal decoding module 110. In one exemplary implementation, the pseudo-code of the BCH decoding procedure is shown as follows:

```
// deinterleave the data bits to obtain the BCH code words (note that
the 1st word in each subframe does not need deinterleave);
Deinterleave the data bits;
// The 1st 15 bits in each subframe contains 11-bit preamble and 4-bit
reserved bits. Thus, the BCH decoding for 1st 15 bits of each subframe
may be bypassed;
// Starting from the 16th bit;
for each BCH code word in the subframe // parity check the received
code words; 19 BCH code words in one subframe;
{
    Message(k) = Extract the first 11-bit of the BCH code word;
    ReceivedParity(k) = Extract the last 4-bit of the BCH code word;
    ExpectedParity(k) = Find the corresponding 4-bit parity bits
from the LUT based on the exacted Message(k);
    if ReceivedParity (k)!= ExpectedParity (k) //if the parity check
fails;
    {
        discard this subframe;
        break;
    }
    else        //if the parity check passes;
    {
        Continue;
    }
}
```

In yet another approach, a Hamming decoding may be employed to implement the signal decoding module 110. In an exemplary implementations, in a GPS navigation data structure, the bit rate may be 50 bit/s, and the bit duration may be equivalent to 20 periods of the Gold spreading sequence. The bits may be grouped into 30-bit words (0.6 second), and there may be 24 information bits and 6 parity bits in each word, and 10 words in each subframe that may last approximately 6 seconds. The first two words of each subframe may be telemetry (TLM) and handover words (HOW), which carries little information other than preamble (for subframe synchronization), such as time of the week and subframe ID. The remaining eight words may carry the almanac or ephemeris information. In one exemplary implementation, there may be five subframes in each frame that may last approximately 30 seconds. The first three subframes may comprise the clock and SV ephemeris, which can be satellite specific and can be repeated every frame. The last two subframes may comprise almanac data, which can be the same for all satellites and may require 25 frames (12.5 minutes) to transmit the whole almanac.

In each 30-bit word, there can be 24 information bits and 6 parity bits, encoded by an extended Hamming (32, 26) block code. The input of the encoder can comprise of 24 information bits $d_i$, i=1 . . . 24, and the last two parity bits of the previous word, $D^*_{29}$ and $D^*_{30}$. There can be 30 bits at the output of the encoder, $D_i$, i=1 . . . 0.30, where $D_{25} \ldots D_{30}$ can be the parity bits. The encoding equations are given below:

$$D_i = d_i \oplus D^*_{30}, i=1 \ldots 24$$

$$D_{25} = D^*_{29} \oplus d_1 \oplus d_2 \oplus d_3 \oplus d_5 \oplus d_6 \oplus d_{10} \oplus d_{11} \oplus d_{12} \oplus d_{13} \oplus d_{14} \oplus d_{17} \oplus d_{18} \oplus d_{20} \oplus d_{23}$$

$$D_{26} = D^*_{30} \oplus d_2 \oplus d_3 \oplus d_4 \oplus d_6 \oplus d_7 \oplus d_{11} \oplus d_{12} \oplus d_{13} \oplus d_{14} \oplus d_{15} \oplus d_{18} \oplus d_{19} \oplus d_{21} \oplus d_{24}$$

$$D_{27} = D^*_{29} \oplus d_1 \oplus d_3 \oplus d_4 \oplus d_5 \oplus d_7 \oplus d_8 \oplus d_{12} \oplus d_{13} \oplus d_{14} \oplus d_{15} \oplus d_{16} \oplus d_{19} \oplus d_{20} \oplus d_{22}$$

$$D_{28}=D^*_{30}\oplus d_2\oplus d_4\oplus d_5\oplus d_6\oplus d_8\oplus d_9\oplus d_{13}\oplus d_{14}\oplus d_{15}\oplus d_{16}\oplus d_{17}\oplus d_{20}\oplus d_{21}\oplus d_{23}$$

$$D_{29}=D^*_{30}\oplus d_1\oplus d_3\oplus d_5\oplus d_6\oplus d_7\oplus d_9\oplus d_{10}\oplus d_{14}\oplus d_{15}\oplus d_{16}\oplus d_{17}\oplus d_{18}\oplus d_{21}\oplus d_{22}\oplus d_{24}$$

$$D_{30}=D^*_{29}\oplus d_3\oplus d_5\oplus d_6\oplus d_8\oplus d_9\oplus d_{10}\oplus d_{11}\oplus d_{13}\oplus d_{15}\oplus d_{19}\oplus d_{22}\oplus d_{23}\oplus d_{24}$$

The parity equations can be written in terms of $D_i$'s instead of $d_i$'s as follows:

$$D_{25}=D^*_{29}\oplus D_1\oplus D_2\oplus D_3\oplus D_5\oplus D_6\oplus D_{10}\oplus D_{11}\oplus D_{12}\oplus D_{13}\oplus D_{14}\oplus D_{17}\oplus D_{18}\oplus D_{20}\oplus D_{23}$$

$$D_{26}=D^*_{30}\oplus D_2\oplus D_3\oplus D_4\oplus D_6\oplus D_7\oplus D_{11}\oplus D_{12}\oplus D_{13}\oplus D_{14}\oplus D_{15}\oplus D_{18}\oplus D_{19}\oplus D_{21}\oplus D_{24}$$

$$D_{27}=D^*_{29}\oplus D_1\oplus D_3\oplus D_4\oplus D_5\oplus D_7\oplus D_8\oplus D_{12}\oplus D_{13}\oplus D_{14}\oplus D_{15}\oplus D_{16}\oplus D_{19}\oplus D_{20}\oplus D_{22}$$

$$D_{28}=D^*_{30}\oplus D_2\oplus D_4\oplus D_5\oplus D_6\oplus D_8\oplus D_9\oplus D_{13}\oplus D_{14}\oplus D_{15}\oplus D_{16}\oplus D_{17}\oplus D_{20}\oplus D_{21}\oplus D_{23}$$

$$D_{29}=D_1\oplus D_3\oplus D_5\oplus D_6\oplus D_7\oplus D_9\oplus D_{10}\oplus D_{14}\oplus D_{15}\oplus D_{16}\oplus D_{17}\oplus D_{18}\oplus D_{21}\oplus D_{22}\oplus D_{24}$$

$$D_{30}=D^*_{29}\oplus D^*_{30}\oplus D_3\oplus D_5\oplus D_6\oplus D_8\oplus D_9\oplus D_{10}\oplus D_{11}\oplus D_{13}\oplus D_{15}\oplus D_{19}\oplus D_{22}\oplus D_{23}\oplus D_{24}$$

Note that the term $D^*_{30}$ may be removed from the equation of $D_{29}$ and added to the equation of $D_{30}$ because the number of $d_i$'s in the corresponding encoder equations may be an odd number. The parity equations may be represented in the systematic parity check matrix. According to aspects of the present disclosure, it can be verified that the first five rows of the parity matrix may be from the (31, 26) Hamming code, i.e., its columns may comprise all nonzero 5-tuples. The minimum Hamming distance of the code can be 3, which can be a single-error-correcting code. To obtain the extended Hamming (32, 26) code, an extra parity check bit may be introduced by adding an all-one row into the parity check matrix. In this way, the Hamming weight of the codewords may be made even, and the minimum Hamming distance may be increased to four. To keep the parity matrix in the systematic form, the first 5 rows may be subtracted from the last row, giving the last row.

It can be verified that all-one vector can be a valid codeword. Therefore, if there is an initial phase inversion (before $D^*_{29}$) in the receiver, the parity check may still pass. Information bits obtained may still be correct because they are differentially encoded with the reference of $D^*_{30}$. Thus, the initial phase ambiguity may be resolved in demodulation.

Figure 7:
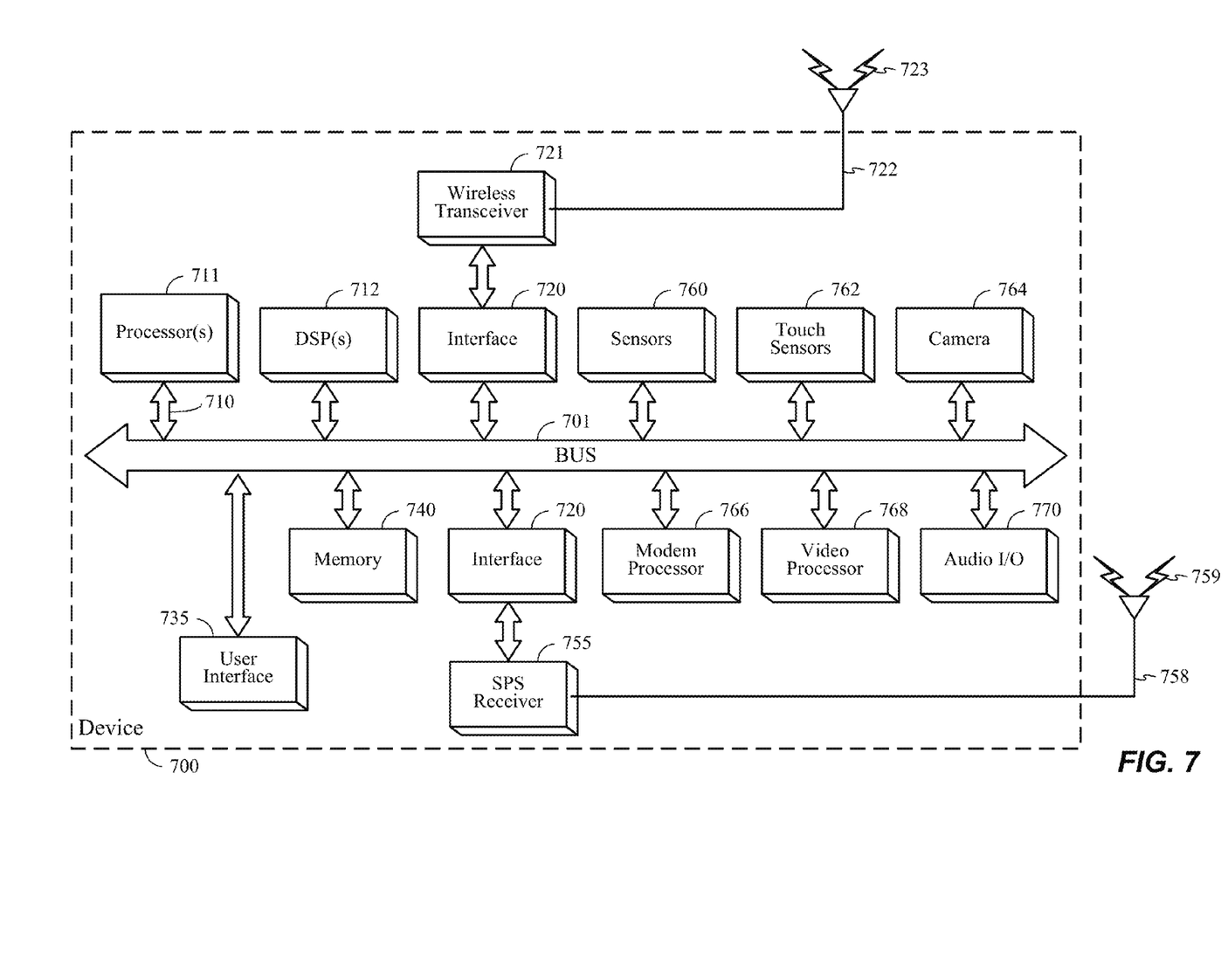
FIG. 7 illustrates an exemplary block diagram of a device according to aspects of the present disclosure.

FIG. 7 illustrates an exemplary block diagram of a device according to aspects of the present disclosure. As shown in FIG. 7, satellite receiver 102 (FIG. 1) may comprise one or more features of device 700 shown in FIG. 7. In certain embodiments, device 700 may also comprise a wireless transceiver 721 which is capable of transmitting and receiving wireless signals 723 via wireless antenna 722 over a wireless communication network. Wireless transceiver 721 may be connected to bus 701 by a wireless transceiver bus interface 720. Wireless transceiver bus interface 720 may, in some embodiments be at least partially integrated with wireless transceiver 721. Some embodiments may include multiple wireless transceivers 721 and wireless antennas 722 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, etc.

Device 700 may also comprise SPS receiver 755 capable of receiving and acquiring SPS signals 759 via SPS antenna 758. SPS receiver 755 may also process, in whole or in part, acquired SPS signals 759 for estimating a location of satellite receiver 102. In some embodiments, processor(s) 711, memory 740, DSP(s) 712 and/or specialized processors (not shown) may also be utilized to process acquired SPS signals, in whole or in part, and/or calculate an estimated location of device 700, in conjunction with SPS receiver 755. Storage of SPS or other signals for use in performing positioning operations may be performed in memory 740 or registers (not shown).

Also shown in FIG. 7, device 700 may comprise digital signal processor(s) (DSP(s)) 712 connected to the bus 701 by a bus interface 710, processor(s) 711 connected to the bus 701 by a bus interface 710 and memory 740. Bus interface 710 may be integrated with the DSP(s) 712, processor(s) 711 and memory 740. In various embodiments, functions may be performed in response execution of one or more machine-readable instructions stored in memory 740 such as on a computer-readable storage medium, such as RAM, ROM, FLASH, or disc drive, just to name a few example. The one or more instructions may be executable by processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712 to perform functions described herein. In a particular implementation, wireless transceiver 721 may communicate with processor(s) 711 and/or DSP(s) 712 through bus 701 to enable device 700 to be configured as a wireless STA as discussed above. Processor(s) 711 and/or DSP(s) 712 may execute instructions to execute one or more aspects of processes/logical operations discussed above in connection with FIGS. 2, 3, 5 and 6.

Also shown in FIG. 7, a user interface 735 may comprise any one of several devices such as, for example, a speaker, microphone, display device, vibration device, keyboard, touch screen, etc. In a particular implementation, user interface 735 may enable a user to interact with one or more applications hosted on device 700. For example, devices of user interface 735 may store analog or digital signals on memory 740 to be further processed by DSP(s) 712 or processor 711 in response to action from a user. Similarly, applications hosted on device 700 may store analog or digital signals on memory 740 to present an output signal to a user. In another implementation, device 700 may optionally include a dedicated audio input/output (I/O) device 770 comprising, for example, a dedicated speaker, microphone, digital to analog circuitry, analog to digital circuitry, amplifiers and/or gain control. In another implementation, device 700 may comprise touch sensors 762 responsive to touching or pressure on a keyboard or touch screen device.

Device 700 may also comprise a dedicated camera device 764 for capturing still or moving imagery. Dedicated camera device 764 may comprise, for example an imaging sensor (e.g., charge coupled device or CMOS imager), lens, analog to digital circuitry, frame buffers, etc. In one implementation, additional processing, conditioning, encoding or compression of signals representing captured images may be performed at processor 711 or DSP(s) 712. Alternatively, a dedicated video processor 768 may perform conditioning, encoding, compression or manipulation of signals representing captured images. Additionally, dedicated video processor 768 may decode/decompress stored image data for presentation on a display device (not shown) on device 700.

Device 700 may also comprise sensors 760 coupled to bus 701 which may include, for example, inertial sensors and environment sensors. Inertial sensors of sensors 760 may comprise, for example accelerometers (e.g., collectively responding to acceleration of device 700 in three dimensions), one or more gyroscopes or one or more magnetometers (e.g., to support one or more compass applications). Environment sensors of device 700 may comprise, for example, temperature sensors, barometric pressure sensors, ambient light sensors, and camera imagers, microphones, just to name few examples. Sensors 760 may generate analog or digital signals that may be stored in memory 740 and processed by DPS(s) or processor 711 in support of one or more applications such as, for example, applications directed to positioning or navigation operations.

In a particular implementation, device 700 may comprise a dedicated modem processor 766 capable of performing baseband processing of signals received and down-converted at wireless transceiver 721 or SPS receiver 755. Similarly, dedicated modem processor 766 may perform baseband processing of signals to be up-converted for transmission by wireless transceiver 721. In alternative implementations, instead of having a dedicated modem processor, baseband processing may be performed by a processor or DSP (e.g., processor 711 or DSP(s) 712).

Note that at least the following three paragraphs, FIG. 1 through FIG. 7 and their corresponding descriptions provide means for receiving a first sub-frame; means for deferring a determination of validity of the first sub-frame until a preamble of a second sub-frame is received; means for receiving the preamble of the second sub-frame; means for determining whether there is a data decoding error of the first sub-frame using the first sub-frame and the preamble of the second sub-frame; means for decoding the first sub-frame to generate a preamble of the first sub-frame and decoded codewords of the first sub-frame, where the preamble of the first sub-frame and the decoded codewords of the first sub-frame form a decoded first sub-frame; means for determining whether there is a data decoding error of the first sub-frame based at least in part on the preamble of the first sub-frame, the decoded codewords of the first sub-frame, and the preamble of the second sub-frame; means for performing a parity check on the decoded codewords of the first sub-frame; means for accepting the decoded codewords of the first sub-frame if the parity check passes; means for discarding the decoded codewords of the first sub-frame if the parity check fails; means for comparing a polarity of the preamble of the first sub-frame and a polarity of the preamble of the second sub-frame; means for accepting the decoded codewords of the first sub-frame if there is a match between the polarity of the preamble of the first sub-frame and the polarity of the preamble of the second sub-frame; means for discarding the decoded codewords of the first sub-frame if there is a mismatch between the polarity of the preamble of the first sub-frame and the polarity of the preamble of the second sub-frame; means for predicting the first sub-frame to form a predicted first sub-frame; means for comparing the predicted first sub-frame to the decoded first sub-frame; means for accepting the decoded first sub-frame if there is a match between the predicted first sub-frame and the decoded first sub-frame; and means for discarding the decoded first sub-frame if there is a mismatch between the predicted first sub-frame and the decoded first sub-frame.

The methodologies and device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media and/or other non-transitory media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable navigation device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of decoding data between consecutive sub-frames of a satellite signal, comprising:
   receiving a first sub-frame;
   deferring a determination of validity of the first sub-frame until a preamble of a second sub-frame is received;
   receiving the preamble of the second sub-frame; and
   determining whether there is a data decoding error of the first sub-frame using the first sub-frame and the preamble of the second sub-frame,
   wherein the first sub-frame includes a preamble and a plurality of words, wherein each word includes one or more interleaved codewords; and
   wherein the first sub-frame and the second sub-frame are consecutive sub-frames of the satellite signal.

2. The method of claim 1, wherein determining whether there is a data decoding error of the first sub-frame comprises:
   decoding the first sub-frame to generate a preamble of the first sub-frame and decoded codewords of the first sub-frame, wherein the preamble of the first sub-frame and the decoded codewords of the first sub-frame form a decoded first sub-frame; and
   determining whether there is a data decoding error of the first sub-frame based at least in part on the preamble of the first sub-frame, the decoded codewords of the first sub-frame, and the preamble of the second sub-frame.

3. The method of claim 2, wherein the determining whether there is a data decoding error of the first sub-frame further comprises:
   performing a parity check on the decoded codewords of the first sub-frame;
   accepting the decoded codewords of the first sub-frame if the parity check passes; and
   discarding the decoded codewords of the first sub-frame if the parity check fails.

4. The method of claim 2, wherein the determining whether there is a data decoding error of the first sub-frame further comprises:
   comparing a polarity of the preamble of the first sub-frame and a polarity of the preamble of the second sub-frame;
   accepting the decoded codewords of the first sub-frame if there is a match between the polarity of the preamble of the first sub-frame and the polarity of the preamble of the second sub-frame; and
   discarding the decoded codewords of the first sub-frame if there is a mismatch between the polarity of the preamble of the first sub-frame and the polarity of the preamble of the second sub-frame.

5. The method of claim 2, wherein the determining whether there is a data decoding error of the first sub-frame further comprises:
   predicting the first sub-frame to form a predicted first sub-frame;
   comparing the predicted first sub-frame to the decoded first sub-frame;
   accepting the decoded first sub-frame if there is a match between the predicted first sub-frame and the decoded first sub-frame; and
   discarding the decoded first sub-frame if there is a mismatch between the predicted first sub-frame and the decoded first sub-frame.

6. A GNSS receiver, comprising:
   a wireless transceiver; and
   a signal decoding module; wherein
   the wireless transceiver includes logic configured to receive a first sub-frame, the signal decoding module includes logic configured to defer a determination of validity of the first sub-frame until a preamble of a second sub-frame is received, the wireless transceiver includes logic configured to receive the preamble of the second sub-frame, and the signal decoding module includes logic configured to determine whether there is a data decoding error of the first sub-frame using the first sub-frame and the preamble of the second sub-frame, wherein the first sub-frame includes a preamble and a plurality of words, wherein each word includes one or more interleaved codewords; and wherein the first sub-frame and the second sub-frame are consecutive sub-frames of the satellite signal.

7. The GNSS receiver of claim 6, wherein the logic configured to determine whether there is a data decoding error of the first sub-frame comprises:

logic configured to decode the first sub-frame to generate a preamble of the first sub-frame and decoded codewords of the first sub-frame, wherein the preamble of the first sub-frame and the decoded codewords of the first sub-frame form a decoded first sub-frame; and logic configured to determine whether there is a data decoding error of the first sub-frame based at least in part on the preamble of the first sub-frame, the decoded codewords of the first sub-frame, and the preamble of the second sub-frame.

8. The GNSS receiver of claim 7, wherein the logic configured to determine whether there is a data decoding error of the first sub-frame further comprises:

logic configured to perform a parity check on the decoded codewords of the first sub-frame;

logic configured to accept the decoded codewords of the first sub-frame if the parity check passes; and logic configured to discard the decoded codewords of the first sub-frame if the parity check fails.

9. The GNSS receiver of claim 7, wherein the logic configured to determine whether there is a data decoding error of the first sub-frame further comprises:

logic configured to compare a polarity of the preamble of the first sub-frame and a polarity of the preamble of the second sub-frame;

logic configured to accept the decoded codewords of the first sub-frame if there is a match between the polarity of the preamble of the first sub-frame and the polarity of the preamble of the second sub-frame; and logic configured to discard the decoded codewords of the first sub-frame if there is a mismatch between the polarity of the preamble of the first sub-frame and the polarity of the preamble of the second sub-frame.

10. The GNSS receiver of claim 7, wherein the logic configured to determine whether there is a data decoding error of the first sub-frame further comprises:

logic configured to predict the first sub-frame to form a predicted first sub-frame;

logic configured to compare the predicted first sub-frame to the decoded first sub-frame;

logic configured to accept the decoded first sub-frame if there is a match between the predicted first sub-frame and the decoded first sub-frame; and logic configured to discard the decoded first sub-frame if there is a mismatch between the predicted first sub-frame and the decoded first sub-frame.

11. A computer program product comprising non-transitory medium storing instructions for execution by one or more computer systems, the instructions comprising:

instructions for receiving a first sub-frame;

instructions for deferring a determination of validity of the first sub-frame until a preamble of a second sub-frame is received;

instructions for receiving the preamble of the second sub-frame; and instructions for determining whether there is a data decoding error of the first sub-frame using the first sub-frame and the preamble of the second sub-frame, wherein the first sub-frame includes a preamble and a plurality of words, wherein each word includes one or more interleaved codewords; and wherein the first sub-frame and the second sub-frame are consecutive sub-frames of the satellite signal.

12. The computer program product of claim 11, wherein the instructions for determining whether there is a data decoding error of the first sub-frame comprises:

instructions for decoding the first sub-frame to generate a preamble of the first sub-frame and decoded codewords of the first sub-frame, wherein the preamble of the first sub-frame and the decoded codewords of the first sub-frame form a decoded first sub-frame; and instructions for determining whether there is a data decoding error of the first sub-frame based at least in part on the preamble of the first sub-frame, the decoded codewords of the first sub-frame, and the preamble of the second sub-frame.

13. The computer program product of claim 12, wherein the instructions for determining whether there is a data decoding error of the first sub-frame further comprises:

instructions for performing a parity check on the decoded codewords of the first sub-frame;

instructions for accepting the decoded codewords of the first sub-frame if the parity check passes; and instructions for discarding the decoded codewords of the first sub-frame if the parity check fails.

14. The computer program product of claim 12, wherein the instructions for determining whether there is a data decoding error of the first sub-frame further comprises:

instructions for comparing a polarity of the preamble of the first sub-frame and a polarity of the preamble of the second sub-frame;

instructions for accepting the decoded codewords of the first sub-frame if there is a match between the polarity of the preamble of the first sub-frame and the polarity of the preamble of the second sub-frame; and instructions for discarding the decoded codewords of the first sub-frame if there is a mismatch between the polarity of the preamble of the first sub-frame and the polarity of the preamble of the second sub-frame.

15. The computer program product of claim 12, wherein the instructions for determining whether there is a data decoding error of the first sub-frame further comprises:

instructions for predicting the first sub-frame to form a predicted first sub-frame;

instructions for comparing the predicted first sub-frame to the decoded first sub-frame;

instructions for accepting the decoded first sub-frame if there is a match between the predicted first sub-frame and the decoded first sub-frame; and instructions for discarding the decoded first sub-frame if there is a mismatch between the predicted first sub-frame and the decoded first sub-frame.

16. An apparatus, comprising:
   means for receiving a first sub-frame;
   means for deferring a determination of validity of the first sub-frame until a preamble of a second sub-frame is received;
   means for receiving the preamble of the second sub-frame; and
   means for determining whether there is a data decoding error of the first sub-frame using the first sub-frame and the preamble of the second sub-frame,
   wherein the first sub-frame includes a preamble and a plurality of words, wherein each word includes one or more interleaved codewords; and
   wherein the first sub-frame and the second sub-frame are consecutive sub-frames of the satellite signal.

17. The apparatus of claim 16, wherein the means for determining whether there is a data decoding error of the first sub-frame comprises:
   means for decoding the first sub-frame to generate a preamble of the first sub-frame and decoded codewords of the first sub-frame, wherein the preamble of the first sub-frame and the decoded codewords of the first sub-frame form a decoded first sub-frame; and
   means for determining whether there is a data decoding error of the first sub-frame based at least in part on the preamble of the first sub-frame, the decoded codewords of the first sub-frame, and the preamble of the second sub-frame.

18. The apparatus of claim 17, wherein the means for determining whether there is a data decoding error of the first sub-frame further comprises:
   means for performing a parity check on the decoded codewords of the first sub-frame;
   means for accepting the decoded codewords of the first sub-frame if the parity check passes; and
   means for discarding the decoded codewords of the first sub-frame if the parity check fails.

19. The apparatus of claim 17, wherein the means for determining whether there is a data decoding error of the first sub-frame further comprises:
   means for comparing a polarity of the preamble of the first sub-frame and a polarity of the preamble of the second sub-frame;
   means for accepting the decoded codewords of the first sub-frame if there is a match between the polarity of the preamble of the first sub-frame and the polarity of the preamble of the second sub-frame; and
   means for discarding the decoded codewords of the first sub-frame if there is a mismatch between the polarity of the preamble of the first sub-frame and the polarity of the preamble of the second sub-frame.

20. The apparatus of claim 17, wherein the means for determining whether there is a data decoding error of the first sub-frame further comprises:
   means for predicting the first sub-frame to form a predicted first sub-frame;
   means for comparing the predicted first sub-frame to the decoded first sub-frame;
   means for accepting the decoded first sub-frame if there is a match between the predicted first sub-frame and the decoded first sub-frame; and
   means for discarding the decoded first sub-frame if there is a mismatch between the predicted first sub-frame and the decoded first sub-frame.

\* \* \* \* \*